B. A. SPINNEY.
HAY LOADER.
APPLICATION FILED MAY 25, 1908.
952,847.
Patented Mar. 22, 1910.
2 SHEETS—SHEET 1.
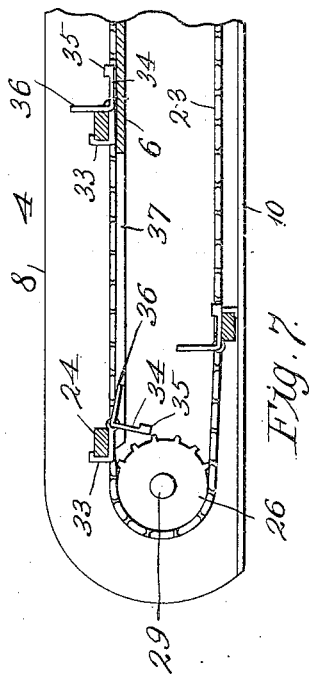
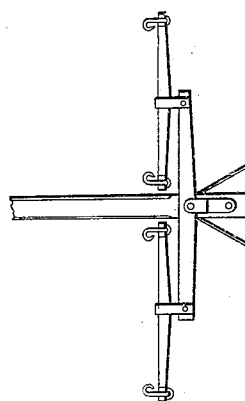
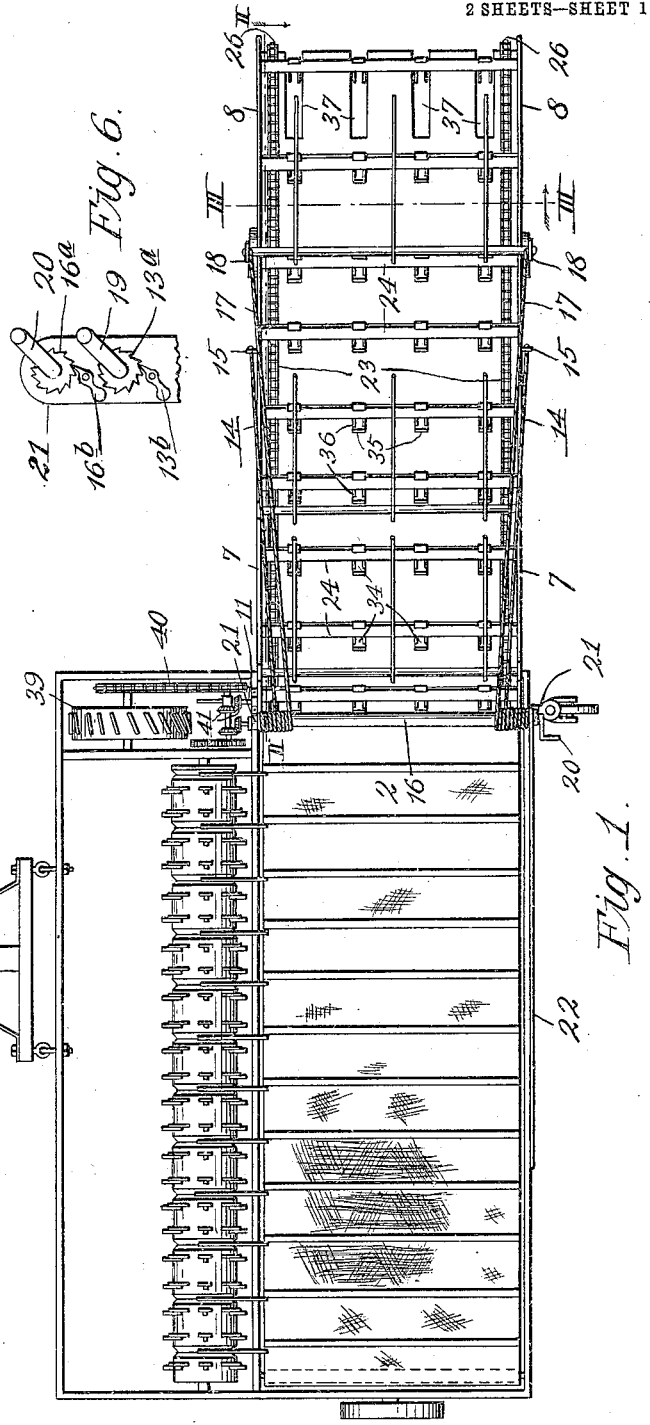
WITNESSES:
E. E. Seidelman
M. Cox
INVENTOR.
Burton A. Spinney,
BY F. G. Fischer
ATTORNEY.

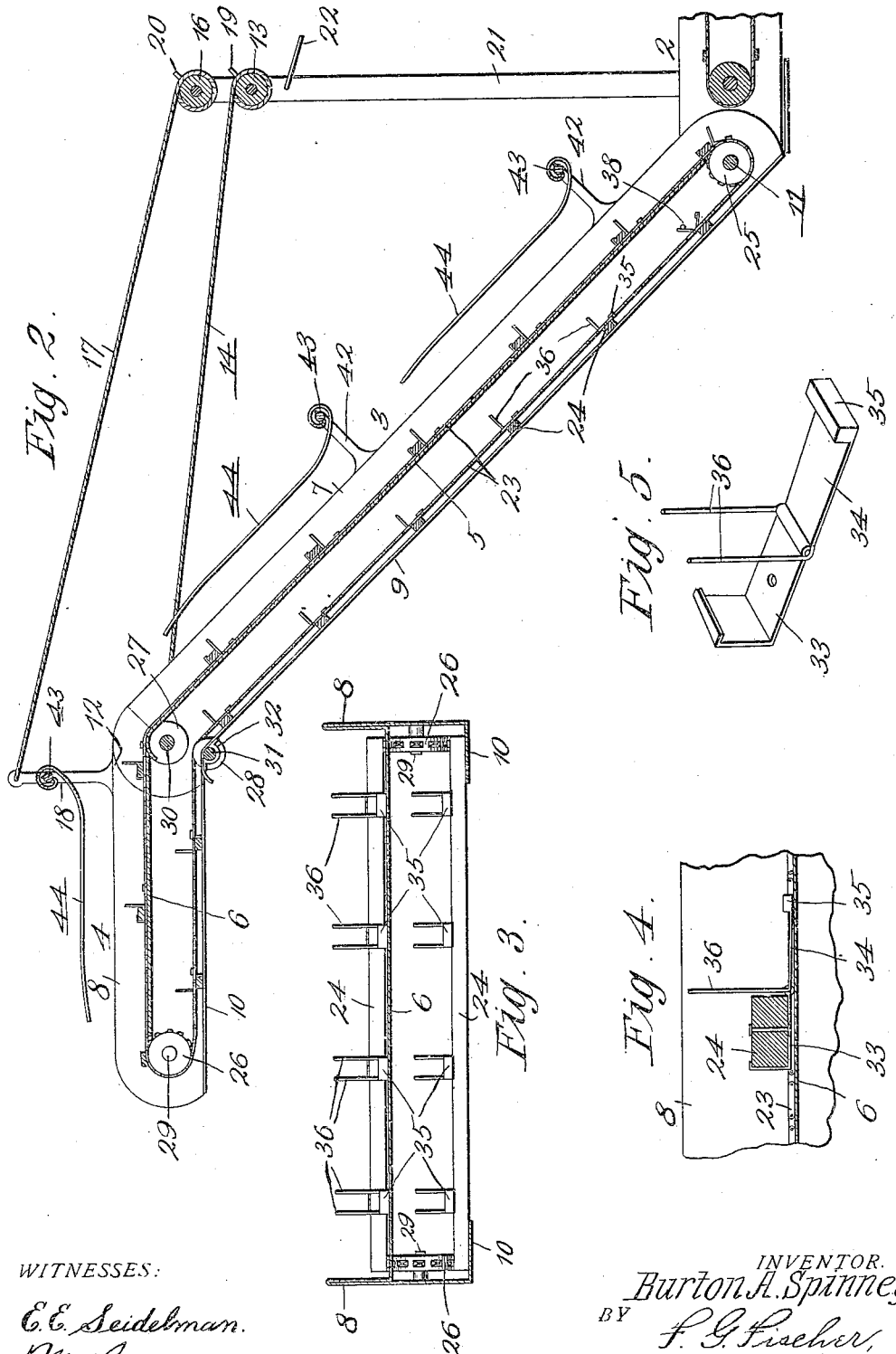

UNITED STATES PATENT OFFICE.

BURTON A. SPINNEY, OF ATLANTIC, IOWA.

HAY-LOADER.

952,847.	Specification of Letters Patent.	Patented Mar. 22, 1910.

Application filed May 25, 1908. Serial No. 434,734.

*To all whom it may concern:*

Be it known that I, BURTON A. SPINNEY, a citizen of the United States, residing at Atlantic, in the county of Cass and State of Iowa, have invented certain new and useful Improvements in Hay-Loaders, of which the following is a specification.

My invention relates to improvements in hay-loaders, and is designed to be attached to the delivery-end of a hay-rake for the purpose of elevating the hay therefrom and loading it into a wagon.

In the accompanying drawings, which illustrate the invention: Figure 1 represents a plan view of the loader attached to a hay-rake. Fig. 2 is a vertical sectional view of the loader on line II—II of Fig. 1. Fig. 3 is a cross section of the loader on line III—III of Fig. 1. Figs. 4 to 7, inclusive, are details, hereinafter fully described.

1 designates the hay-rake, which may be of any ordinary or preferred type, provided with a delivery-end 2, to which my improved loader is attached. In constructing said loader I employ a frame consisting of two sections 3 and 4, comprising bottom portions 5 and 6, side portions 7 and 8, and flanges 9 and 10, respectively, which latter extend inward from the lower margins of the sections, see Fig. 3. Section 3 is mounted upon a shaft 11 carried by the delivery-end of the hay-rake, and section 4 is secured to the upper end of section 3 by hinges 12. Section 3 is adjusted up or down by means of a windlass 13 and a pair of cables 14, which latter are attached at their ends to the windlass and a pair of eyes 15 projecting from the opposite sides of the upper portions of section 3. Section 4 is adjusted independently of section 3 by means of a windlass 16 and a pair of cables 17, which latter are attached at their ends to the windlass and a pair of arms 18 secured to section 4 near its hinged ends. Windlasses 13 16 are provided with cranks 19 20, and ratchet-wheels 13ª and 16ª, respectively, which latter in conjunction with gravity pawls 13ᵇ and 16ᵇ hold the windlasses from accidental backward rotation. The windlasses are mounted upon a pair of standards 21 secured to the delivery-end of the hay-rake. One of the standards carries pawls 13ᵇ and 16ᵇ and is reinforced by a brace 22, extending from the upper portion thereof to the frame of the hay-rake.

The loader lifts the hay from the rake to the wagon by a conveyer consisting of a pair of endless sprocket-chains 23, a plurality of transverse slats 24 uniting the sprocket-chains, sprocket-wheels 25 26 and idlers 27 28 over which the sprocket-chains travel. Sprocket-wheels 25 are mounted upon shaft 11, sprocket-wheels 26 are mounted upon stub-shafts 29 extending inwardly to the delivery-end of section 4, idlers 27 are mounted upon a transverse shaft 30 forming the pintle of hinges 12, and idlers 28 are mounted upon a shaft 31 which is mounted in bearings 32 secured to flanges 9.

Slats 24 are provided with a plurality of devices for engaging the hay and carrying it upward. Each device consists of a strap 33 secured to its respective slat, an arm 34 pivoted to one end of strap 33, and provided at its free end with a weight 35, and fingers 36 secured to the arm and extending at an angle thereto for the purpose of engaging the hay.

When the devices are traveling upward to the delivery-end of the loader, fingers 36 are held upward in engagement with the hay by arms 34 which slide along upon the bottom portions of sections 3 and 4 until they reach a plurality of slots 37 in the outer end of bottom 6. As the devices successively reach the slots the weighted arms will drop therethrough to the position shown in Fig. 7, and carry the fingers out of engagement with the hay so that the latter will be pushed by the following hay from the discharge end of the loader without a portion of it being carried back by the fingers. The slats are supported while returning to the lower end of the loader by flanges 10 and 9, respectively, and the devices will be held in the position shown in Figs. 2 and 7 until they contact with a trip-rod 38 extending transversely across the lower portion of section 3. On contacting with said rod the devices will be restored to their normal position preparatory to again starting upward to the delivery-end of the loader.

The conveyer may be operated by any suitable means, in the drawings I have shown shaft 11 connected with the main wheel 39 of the hay-rake, through the instrumentality of sprocket gearing 40 and bevel gearing 41.

42 designates a plurality of arms secured to section 3 and united in pairs by transverse rods 43, carrying resilient retaining members 44 arranged a slight distance above the section to prevent the hay from being blown therefrom on a windy day. Arms 18 are also united by a transverse rod 43 provided with resilient retaining members 44 arranged a slight distance above section 4.

Having thus described my invention, what I claim is:—

1. The combination with a hay-rake, of a loader communicating with the delivery-end thereof, consisting of a frame having a bottom portion slotted near its discharge end and inturned flanges at its under edges, sprocket-wheels mounted in said frame, sprocket-chains running around said sprocket-wheels, transverse slats connected to said sprocket-chains and adapted to slide upon the inturned flanges on their return movement, hay-engaging devices pivotally-connected to the slats adapted to drop through the slots in the bottom to a reverse position upon the slats, and a trip-rod extending across the lower portion of the frame in the path of the hay-engaging devices which latter are directed against said trip-rod by means of the inturned flanges and the slats.

2. The combination with a hay-rake, of a loader communicating with the delivery-end thereof, consisting of a frame having a bottom portion slotted near its discharge end and inturned flanges at its under edges, a conveyer carried by said frame including transverse slats adapted to slide upon the inturned flanges on their return movement, a plurality of devices comprising straps secured to said slats, weighted arms pivotally connected to said straps, fingers secured to said arms adapted to drop through the slots in the bottom of the conveyer to a reverse position upon the slats, and a trip-rod extending across the lower portion of the frame in the path of the fingers, which latter are directed against said trip-rod by means of the inturned flanges and the slats.

In testimony whereof I affix my signature, in the presence of two witnesses.

BURTON A. SPINNEY.

Witnesses:
P. T. STAFFORD,
WALTER H. SCHUL.